Sept. 22, 1964   R. E. LANG   3,149,601
SELF-ADAPTIVE CONTROL SYSTEM
Filed April 30, 1962   2 Sheets-Sheet 1

INVENTOR
RICHARD E. LANG

BY *Herbert W. Arnold*
ATTORNEY

Sept. 22, 1964 — R. E. LANG — 3,149,601
SELF-ADAPTIVE CONTROL SYSTEM
Filed April 30, 1962 — 2 Sheets-Sheet 2
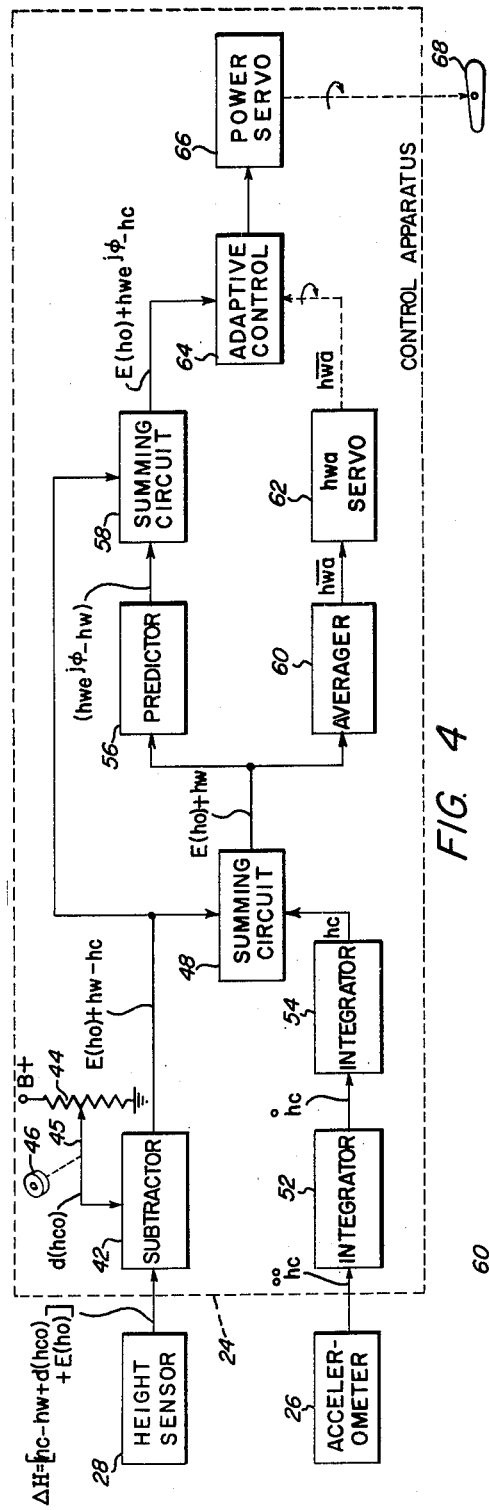
FIG. 4
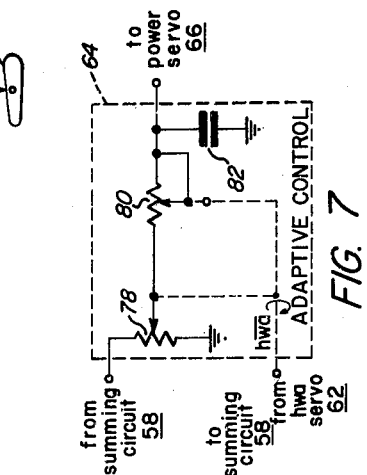
FIG. 7
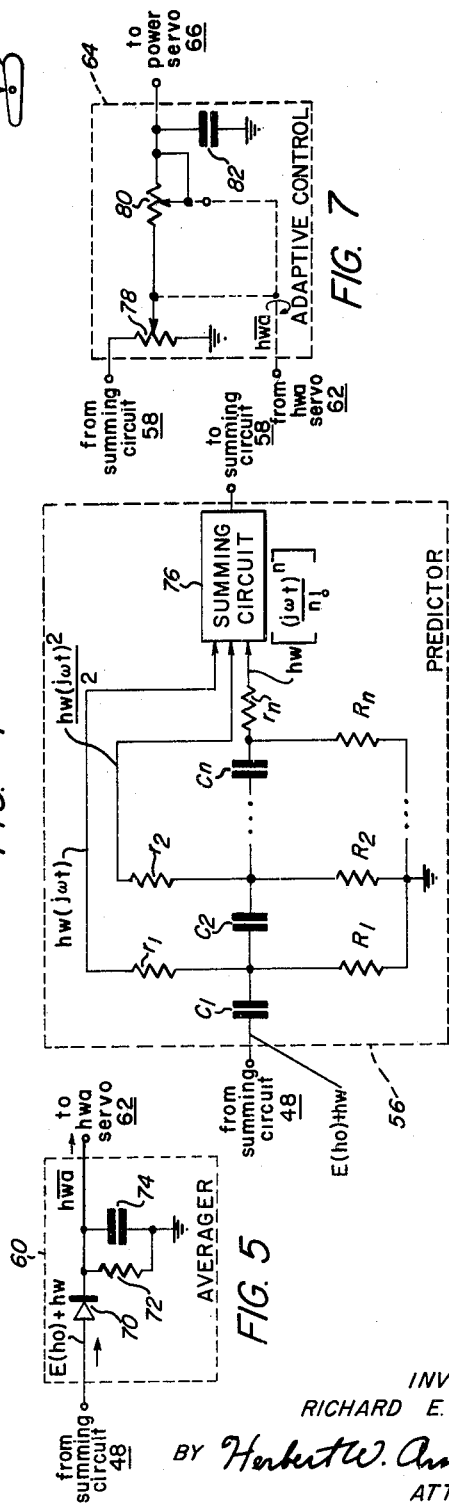
FIG. 5
FIG. 6
INVENTOR
RICHARD E. LANG
BY Herbert W. Arnold
ATTORNEY

United States Patent Office 3,149,601
Patented Sept. 22, 1964

3,149,601
SELF-ADAPTIVE CONTROL SYSTEM
Richard E. Lang, Concord, Mass., assignor to Raytheon Company, Lexington, Mass., a corporation of Delaware
Filed Apr. 30, 1962, Ser. No. 191,078
20 Claims. (Cl. 114—66.5)

This invention relates to a self-adaptive control system for controlling the motion of a vehicle traversing a disturbing or supporting medium and is more particularly concerned with maintaining the response of a hydrofoil craft in phase with the motion of the disturbing medium, the sea.

Hydrofoil craft utilize a hydrofoil support submerged in the water which, for the purpose of reducing resistance to motion, raises the hull of the craft to a higher position with respect to the water in which it travels. The hydrofoil provides an upward force component or "lift" when the craft has forward velocity with respect to the water. When the forward velocity of the craft is sufficiently high, the lift exerted on the hydrofoil by the water raises the entire hull above the surface of the water.

As can be seen from the above, in many respect hydrofoil seacraft and aircraft are similar. Both must take-off, fly and land with the capability of navigation and maneuvering during these phases. Control in the vertical direction, however, differs markedly in at least three significant areas. First, except for take-off and landing, the aircraft is far removed from the surface of discontinuity, that is, the ground. The hydrofoil craft, on the other hand, is always near the surface of the sea. Secondly, the aircraft possesses an ideal reference for vertical control, the pressure altimeter. Variations in pressure-altitude produced by ground profile are insignificant. Therefore deviations from some desired altimeter readings indicate craft motion with respect to the desired altitude. On the other hand, the height sensor of the seacraft indicates at any instant of time the combined effect of both sea and craft motion. Thirdly, the amount of vertical motion allowed for aircraft is relatively unrestricted. In contrast, vertical motion of seacraft must be held to close limits in both amplitude and phase to prevent the hull from crashing or the foils from broaching.

Furthermore, hydrofoil crafts are subject to the ever disturbed condition of the water surface. For example, at a constant velocity of the craft with respect to the water, the lift force is a function of the angle of attack of the hydrofoil, that is, the angle between the water stream line and the chord line of the hydrofoil. Waves and similar disturbances produce changes in the angle of attack and the consequent change in lift tends to cause the craft to ride over or into the waves and not maintain a constant height above the surface. Such variations in angle of attack result in highly inefficient operation of the hydrofoil from a hydrodynamic standpoint since they may result in stalling as well as in wasted power in constantly raising and lowering the craft.

In addition, the response of the craft to the water motion is somewhat delayed by the inertia of the craft, and therefore the upward reaction of the craft to a wave crest might raise the hydrofoil so near the surface of the following wave trough as to cause broaching and subsequent loss of lift.

Accordingly, my invention comprises an automatic control system whereby the motion of a hydrofoil craft is maintained within desired tolerances, so as to follow the motion of the water waves and maintain the craft in phase with said motion in order to eliminate the undesired effects above enumerated, such as broaching of the foils or crashing of the hull during an out of phase condition. In addition, my invention greatly increases the effective length of the seacraft strut which supports the hydrofoil since, with proper implementation of the principles embodied herein, the seacraft can be safely operated at relatively small distances above the water level without danger of broaching or crashing. My control system utilizes inputs from at least one height sensor and one accelerometer. The height sensor, which may comprise well known sensing means, such as radar, sonar, photo-electric, electrolytic or mechanical devices, senses the instantaneous height of the craft with respect to the height of the water wave. The acceleromeer measures or senses the instantaneous vertical acceleration of the craft with respect to a stable platform or inertial reference. In accordance with this invention, the vertical acceleration is doubly integrated to produce a signal proportional to the craft height and referenced to a stable datum line or inertial reference. Craft height provided by the integrator is then added to the difference between the instantaneous water height and craft height sensed by the aforementioned height sensor to produce a signal proportional to vertical water motion or height. This signal, proportional to water motion, is a measurement of what the water is doing with respect to the inertial reference or datum line. The water motion signal is then operated on in a predictor circuit which produces a number of derivatives thereof which, when combined in a summing network with the aforementioned height sensor signal, provides a predicting signal expressive of the future motion of the water wave. This predicting signal is then processed through a self-adaptive variable gain circuit to produce a resulting signal which changes the gain of the system as a function of the sea state and simultaneously changes a critical system time constant to maintain the system consistently stable with respect to the frequency of wave motion. This resulting signal is then utilized as an input to well known power servo mechanisms which ultimately drive the hydrofoil mechanism to such a position as to alter the craft motion in phase with the predicted future wave motion. The invention will be further described with reference to the accompanying drawings in which:

FIGURE 4 is a block-diagram of one embodiment of a control system according to the invention.

FIGURE 5 is a schematic diagram of an averaging circuit in accordance with my invention.

FIGURE 6 is a schematic diagram of a predicting circuit in accordance with my invention.

FIGURE 7 is a schematic diagram of an adaptive control circuit in accordance with my invention.

Figure 1:
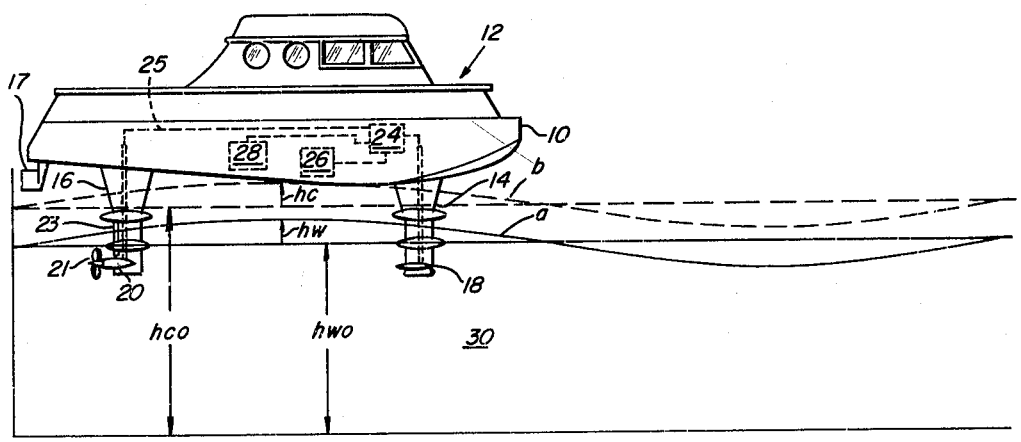
FIGURE 1 is a schematic side elevation of a typical hydrofoil craft traversing a water wave and having a control system according to the invention mounted therein.
Figure 2:
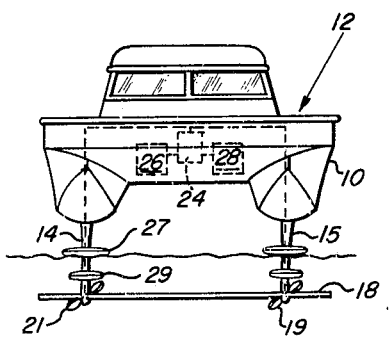
FIGURE 2 is a front view of the craft according to FIGURE 1.

Referring now to FIGS. 1 and 2, a typical hydrofoil craft 12 is shown comprising a hull 10, which is adapted to float on the water when the craft is at rest or traveling at low speed. Forward and aft foils 18 and 20, respectively, are provided for dynamic support of the craft after it gets under way and the hull 10 is raised entirely out of the water with a clearance above the water surface adequate to avoid substantial wave impact against any portion of the hull. The hull body is mounted on the forward foil 18 by means of port strut 15 and starboard strut 14 and there are also two aft struts, one of which, 16, is shown. The struts are shaped for low resistance. The craft is driven by propellers 21 and 19, and may be steered by rudders 23 and 17. A number of fins such as 27 and 29 are provided on each strut for increasing lift during heavy roll conditions. Variation in foil lift is accomplished through tilting the foils up or down as desired through mechanical coupling shown by dotted line 25. Or the foils may have flaps connected thereto, not shown, which can be tilted to accomplish the same purpose. The apparatus in accordance with this invention for controlling the response or contouring of the hydrofoil craft with respect to a water wave 30 comprises height sensor 28, accelerometer 26 and control apparatus 24.

Figure 3:
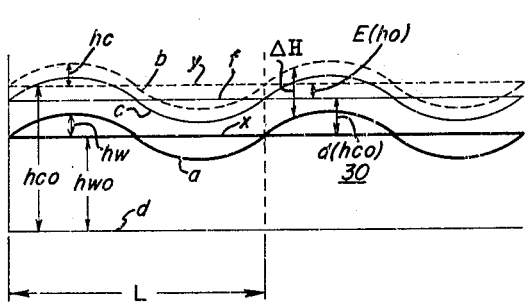
FIGURE 3 is a graphical representation of the wave and craft motion showing the wave terminology utilized in the description of my invention.

Before describing the details of the control means shown in FIG. 4 some knowledge of water wave terminology and parameters is necessary. FIG. 3 is illustrative for this purpose. Referring now to FIG. 3, a deep water wave, curve $a$, is shown corresponding to the water wave of FIG. 1. Superimposed above the water wave is the trajectory of the seacraft shown as curve $b$ in dotted lines in FIGS. 1 and 3. The waves of FIG. 3 are intentionally exaggerated in order to illustrate clearly the meanings of various terms used herein. The instantaneous water height above average is shown and designated as $hw$. The instantaneous craft height above average is shown and designated as $hc$. Line $x$ is the average water height and line $y$ is the average craft height. The average water height is measured from an arbitrary datum line $d$ and is designated $hwo$. Similarly, the average craft height is designated as $hco$. Curve $c$ represents the desired craft trajectory and the desired average craft height is designated $d(hco)$. The error of the average craft height is shown and designated as $E(ho)$. Line $f$ is the desired average craft height. The instantaneous separation between craft and wave is designated $\Delta H$.

With respect to the wave parameters, a deep water wave as found in open sea-ways is defined as one existing where the depth of the water is greater than one-half the length, $L$, of the wave. Under this condition, the phase velocity of the wave is determined by the equation:

$$C = \sqrt{\frac{gL}{2\pi}}$$

where $C$=phase velocity of the water wave, and $g$=gravitational acceleration=32 ft./sec.² Thus $C = 2.26 \sqrt{L}$ ft./sec. When the double amplitude H of a wave exceeds ten percent of the length L, the wave front becomes unstable and begins to chop. Furthermore, rarely has the double amplitude H been known to be less than 2% of the wave length L. It can therefore be safely assumed that the ratio of double-amplitude H to wave length L for deep water waves must be greater than or equal to .02 and less than or equal to .10. From the above reasoning an average wave can be considered to have an H/L ratio of 1/20 or an amplitude over length ratio $hwa/L$ of 1/40. Furthermore, assuming that the essential features of the wave motion are harmonic, the maximum vertical velocity and acceleration of the surface become $$(\dot{h}w) \max = .355 \sqrt{L} \text{ ft./second}$$

and, $$(\ddot{h}w) \max = 5.05 \text{ ft./second}^2 = .15 g$$

when:

$$hwa = .025 \ L \text{ feet}$$

The results of human factor studies indicate that a tolerable limit of vertical acceleration for human comfort is approximately .15 g. from 0 to 2 cycles per second and decreasing with frequency beyond 2 cycles per second. Since peak acceleration of harmonic motion is proportional to the product of amplitude and frequency squared, there is an upper frequency beyond which the response of a vertical or heave control system must decrease inversely proportional as the square of the frequency and beyond 2 cycles per second it must decrease inversely proportional to the cube of the frequency in order not to exceed the environmental extremes predicted by the human comfort studies.

From the above analysis it can be seen that a control system, in accordance with this invention, having a frequency response based upon a maximum acceleration of 4 ft./second² or .124 gravitational units is within the range of human passenger comfort. The resultant open loop transfer function, or gain and frequency control necessary to produce a self-adaptive control response within the above mentioned environmental regime is defined by the equation:

(Equation 1)

$$KG = \frac{1/\sqrt{\overline{hwa}}}{\sqrt{\overline{hwa}}\frac{s}{4}+1}$$

wherein:

$KG$=transfer function
$\overline{hwa}$=average wave amplitude and $$s = \sigma + j\omega$$

As can be seen from the above equation, the required frequency and time response characteristics for a practical self-adaptive seacraft control system requires a continuous measurement of $\overline{hwa}$. In addition, to derive a command signal which, when amplified according to the above transfer function, will rotate the hydrofoils so as to correct the craft height according to the predicted future wave motion, a measurement of present wave motion independent of craft motion is required. This measurement must be independent of craft motion, for otherwise, the effect of a seacraft descending on a stationary wave would appear to the control system the same as an ascending wave approaching a stationary craft. This ambiguity becomes intolerable for predicting purposes when, in accordance with this invention, it is desired to predict the future wave motion so as to control the craft motion correspondingly and thereby bring the craft motion and predicted wave motion in phase with one another.

Accordingly, with reference now to FIG. 4, a preferred embodiment of a self-adaptive independent wave motion control system in accordance with this invention is shown. In particular, reference is had to the two sensors, height sensor 28 and accelerometer 26, utilized as inputs to the control apparatus 24. Height sensor 28 is mounted in the craft at any convenient location which is free from obstructions in the line of sight to the water surface. Height sensor 28 can comprise any of the well known height sensing devices which utilize sonar, radar or photoelectric phenomena to measure the instantaneous separation of the craft hull from the water surface or alternatively can consist of electrolytic, hydraulic or mechanical pressure sensitive devices which can be located in the seacraft struts 14–16 of FIG. 1 and which correspondingly produce signals proportional to the instantaneous vertical separation of craft and wave. This signal, the instantaneous height of the craft from the wave as measured by the height sensor, is herein referred to as $\Delta H$.

An analysis of the graph in FIG. 3 shows that $\Delta H$ is equal by definition to the sum of the average craft height ($hco$) and the instantaneous craft height above average ($hc$) minus the sum of the average water height ($hwo$)

and the instantaneous water height above average ($hw$) or:

(Equation 2)
$$\Delta H = (hco + hc) - (hwo + hw)$$

or by combining terms;

(Equation 3)
$$\Delta H = (hc - hw) + (hco - hwo)$$

It is also evident from FIG. 3 that the desired average craft height [$d(hco)$] plus the error of average craft height [$E(ho)$] is equal to the difference between $hco$ and $hwo$ or:

(Equation 4)
$$d(hco) + E(ho) = hco - hwo$$

By substitution of $d(hco) + E(ho)$ for the term $hco - hwo$, in Equation 3 we derive:

(Equation 5)
$$\Delta H = [hc - hw + d(hco) + E(ho)]$$

The signal defined by Equation 5 is shown in FIG. 4 as the output of height sensor 28 and an input signal to subtractor or difference circuit 42. In the embodiment of the invention described in FIG. 4 all signals other than those connections shown in dotted lines which represent mechanical signals are electrical, but limitation of the scope of this invention is not intended thereby, since it is well known in the art, for example, that summing and subtracting functions can be readily performed by mechanical means or hydraulic means such as gear mechanisms or hydraulic valves. Subtractor circuit 42 may consist of well known linear mixer circuits such as difference amplifiers or transformers which subtract quantities or signals algebraically. Reference may be had to the text Electronics by Elmore & Sands, McGraw-Hill Book Company, Inc., New York, 1949, wherein mixers of the type which can be utilized herein as a subtractor are described in detail.

The second input signal to subtractor circuit 42 is $d(hco)$ previously defined as the desired average craft height. This signal is obtained by means of potentiometer 44 which is connected to well known voltage sources designated here as B+. The desired average craft height $d(hco)$ signal may be varied by the craft operator to any desired setting by rotation of knob 46 mechanically coupled to wiper arm 45 of potentiometer 44. This feature of the present invention enables the operator to navigate closer or further away from the water, depending on the roughness of the sea state encountered. By the subtracting process occurring in subtractor circuit 42, an output signal is obtained comprising an error signal proportional to the error of the average craft height from the desired average craft height, previously designated $E(ho)$ and the difference between the instantaneous water height above average $hw$ and the instantaneous craft height above average $hc$. This signal, $E(ho) + hw - hc$ is then algebraically added in summing circuit 48 to a signal proportional to the instantaneous craft height above average $hc$, derived from an inertially referenced source in a manner subsequently described, to produce a signal $E(ho) + hw$. This latter signal is proportional to the water motion and independent of the craft motion and can therefore be used for predicting purposes without the possibility of ambiguity which would be present in a control system which utilizes the relative motion of the craft with respect to the wave for predicting purposes, as previously discussed. In the present invention the resultant signal $E(ho) + hw$ is inertially referenced by combination with inertially referenced $hc$ in the additive process which takes place in summing circuit 48.

The signal proportional to instantaneous craft height above average $hc$, is inertially referenced and produced in the circuit comprising accelerometer 26, integrator 52 and integrator 54. Accelerometers such as are contemplated by this invention are well known linear acceleration sensing devices which, for example, comprise an inertial mass attached to a shaft coupled to a synchro or selsyn rotor. The synchro stator is attached to the accelerometer housing which in turn is affixed to the seacraft. Usually, where only one accelerometer is utilized, the accelerometer is located at the center of gravity of the craft, and measures the acceleration of the craft about the center of gravity. The relative position of the rotor and stator is such that, with no seacraft acceleration in the vertical direction the rotor is in a null position. Under the influence of craft motion about the center of gravity the stator is displaced with respect to the rotor. The rotor remains fixed in space since it is mechanically secured to the accelerometer mass. This change in synchro-rotor-stator relationship produces a signal, the phase of which is determined by the direction of the acceleration and the magnitude of which is directly proportional to vertical craft acceleration $\ddot{hc}$ and inertially referenced to the gyroscopic mass. The instantaneous vertical velocity of the craft $\dot{hc}$ is produced by integrating the $\ddot{hc}$ signal from accelerometer 26 in integrator 52. Well known integrator circuits such as resistance-capacitance networks or resistance-inductance networks having a time constant relatively long with relation to the maximum input waveform period are suitable devices for use in integrators 52 and 54 of my invention. Alternatively well known servo-integrator means can be used for greater accuracy.

The instantaneous vertical displacement or height of the craft above average $hc$ is obtained by integrating $\dot{hc}$ in integrator 54. The spatially referenced signal $hc$ derived from accelerometer sensing device 26 is then algebraically added, as previously mentioned, in summing circuit 48 to the signal $E(ho) + hw - hc$ obtained from subtractor 42 to produce the resultant signal $E(ho) + hw$. This signal is proportional to the instantaneous displacement or height of the water wave above average, $hw$, referenced to an arbitrary datum line or inertial reference which is independent of craft motion, plus an error signal representative of the desired average craft height, $E(ho)$.

The signal $E(ho) + hw$ is then coupled to a predictor circuit which computes and adds a phase shift correction signal to the $hw$ signal by generating a plurality of derivitives of the $hw$ signal. Details of the predictor circuit are subsequently described with reference to FIG. 6. The output from predictor circuit 56 comprises signal $hwe^{j\phi}$ which is a phase leading signal of input signal $hw$, minus the input signal $hw$. It should be noted that the lead phase correction is added to water motion $hw$, not craft motion. The signal $E(ho)$ is filtered out in the predictor circuit. The output of the predictor circuit is then coupled to summing circuit 58, which is a circuit similar to the summing circuit of 48, and is added to the output of subtractor circuit 42 to produce a command signal $E(ho) + hwe^{j\phi} - hc$ which is predictive of the wave shape to be encountered by the craft in the future and is used to control the angle of attack of the hydrofoil surfaces 68 by means of power servo 66 and to change the craft motion in accordance with the command signal, thereby continually maintaining the motion of the craft in phase with the predicted motion of the water wave.

The circuit comprising averager 60, $\overline{hwa}$ servo 62 and adaptive-control 64 continually adjusts the bandwidth and gain parameters of the control loop comprising predictor 56, summing circuit 58 and power servo 66 to provide the frequency and amplitude response characteristics dictated by the craft passenger comfort considerations. In particular the vertical acceleration environment to which the passengers will be subjected dictates the desired gain and frequency response limitations of the craft motion. This environment as was discussed in connection with FIG. 3 is a function of the average wave amplitude $\overline{hwa}$. In accordance with this invention therefore, a signal proportional to $\overline{hwa}$ is obtained by coupling the output $E(ho)+hw$ of summing circuit 48 to averager circuit 60. Averager circuit 60 is shown in FIG. 5 to comprise a unidirectional conducting device, diode 70, impedance means, resistor 72, and storage means, capacitor 74, connected as shown. Diode 70 rectifies the input signal $E(ho)+hw$ so that only positive going wave shapes thereof are passed to the parallel resistance-capacitance circuit. The resistor-capacitor circuit is selected to have a time constant sufficient to average out the $hw$ component of the input signal thereby producing the desired $\overline{hwa}$ wave amplitude signal required to adjust the aforementioned frequency and amplitude response characteristics as a function of the sea state. Signal $\overline{hwa}$ may then be amplified or used directly as an input to servo motor 62 as shown in FIG. 4. Servo motor 62 is a conventional means for translating electrical signals to proportional mechanical torque or displacement signals. The rotational mechanical shaft motion corresponding to the average wave amplitude $\overline{hwa}$ is used as an input to adaptive-control circuit 64 which shall now be described with reference to FIG. 7.

As can be seen in FIG. 7 adaptive-control circuit 64 requires two input signals, one from summing circuit 58, $E(ho)+hwe^{j\phi}-hc$ and the second from the $\overline{hwa}$ servo 62 $\overline{hwa}$. The first signal is the aforementioned command signal used to change the angle of attack of the hydrofoils to bring the craft into phase with the water motion plus an error signal $E(ho)$ which corrects the craft motion according to the desired average craft height selected by the craft operator or pilot. The second signal $\overline{hwa}$ provides information as to the average wave amplitude and is used to drive the wiper-arm of a function generator 78 which may comprise a wire-wound potentiometer wound in such a manner as to produce an electrical output at the wiper-arm proportional to the inverse square root of the wiper-arm driving function, which in this case is $\overline{hwa}$. The signal $\overline{hwa}$ is also coupled to a second function generator 80 which is part of a low pass filter circuit comprising the time constant formed by the resistance of function generator 80 and the capacitance of capacitor 82. This filter circuit generates the function $$1/\sqrt{\overline{hwa}}\frac{S}{4}+1$$

Since the command signal $E(ho)+hwe^{j\phi}-hc$ is passed through the same function generators and band-pass circuit it is evident that the command signal will be varied in accordance with the ratio of $$1/\sqrt{\overline{hwa}} \text{ to } \sqrt{\overline{hwa}}\frac{S}{4}+1$$

In this manner, the gain and frequency band width of the command signal is varied as a function of the sea-state average amplitude thereby maintaining the motion of the craft at all times within the limits of passenger comfort dictated by the transfer function, KG of Equation 1.

It should be noted that the transfer function chosen as an exemplification of my invention was predicated on a specific system analysis and the use thereof in this invention is in nowise meant to be a limitation of the scope of my invention. Numerous other system transfer functions may be chosen depending on the particular application without departing from the spirit and scope of this invention. For example, it is obvious to one skilled in the art that the function generator potentiometers may be wound to produce any desired function. Furthermore, if the craft is completely automated no acceleration limits for passenger comfort will be required. Such an application might be desired for remote controlled craft.

Reference is had now to FIG. 6, wherein the details of predictor circuit 56 can best be explained. As can be seen, predictor circuit 56 comprises a series of resistor-capacitor differentiating networks $C_1R_1$ and $C_2R_2$ and $C_nR_n$, where the numerals 1 and 2 represent the first and second network and the letter $n$ represents the $n$th network, indicating that as many networks as are desired can be built up in the manner illustrated. Each succeeding network produces a higher order differential of $hw$. In mathematical terminology the first time derivative of $hw$ can be represented in the frequency domain as $hw(j\omega t)$ wherein $j$ is equal to $\sqrt{-1}$ and $\omega t$ represents the phase angle $\phi$ of the wave motion $hw$. Correspondingly the second differential of $hw$ is produced at the intersection of $C_2R_2$ and is equal to $$\frac{hw(j\omega t)^2}{2!}$$

the symbol ! meaning factorial. The $n$th differential of $hw$ is similarly designated as $$hw\left[\frac{(j\omega t)^n}{n!}\right]$$

All differentials are added in summing circuit 76 after passing through individual weighting resistors $r_1$, $r_2$ and $r_n$. The output of summing circuit 76 is then a signal corresponding to the signal $hw$ times a weighted sum of derivatives, $$hw\left[j\omega t+\frac{(j\omega t)^2}{2!} \cdots +\frac{(j\omega t)^n}{n!}\right]$$

Since the frequency $\omega$ of wave motion, times the period $t$ of the wave motion is equal to the phase angle $\phi$ of the wave motion, and the expression $e^{j\omega t}$, where $e$ is the irrational number 2.718, can be expanded; by the series expansion rule to $$1+\frac{j\omega t}{1!}+\frac{(j\omega t)^2}{2!}+\frac{(j\omega t)^3}{3!} \cdots$$

it can be readily seen that the output of summing circuit 58, as shown in FIG. 4, can be made substantially equal to $hw[e^{j\phi}-1]$ or $hwe^{j\phi}-hw$ by utilizing as many differentiating circuits as are required for the accuracy desired. This signal $hwe^{j\phi}-hw$ is proportional to the difference between the present wave motion $hw$ and the predicted wave shape of the wave motion $hw$ and when added to the signal $E(ho)+hw-hc$ in summing circuit 58 results in the signal $E(ho)+hwe^{j\phi}-hc$ which, as previously mentioned, comprises an error signal $E(ho)$ indicative of desired average craft height plus a phase correction signal $hwe^{j\phi}$ predictive of the future phase of the water motion, minus the instantaneous craft height above average $hc$ and is used as a command signal to power servo 66 of FIG. 4 which rotates the craft hydrofoils 68 in the correct direction and distance, thus changing the angle of attack thereof and varying the lift so as to bring or maintain the craft motion in phase with the predicted water wave motion.

It should be understood that the foregoing description of an embodiment of the invention is exemplary and that many variations thereof will occur to those skilled in the art without departing from the spirit and scope of this invention. For example, devices shown here as electrical signal producing devices may be substituted for by mechanical, hydraulic or electro-mechanical means. Furthermore, in crafts relatively large with respect to wavelength, it may be desirable to utilize more than one control system for each strut-foil combination. This may be accomplished in a variety of manners. A plurality of sensors may be situated in proximity to each strut and their outputs combined in a multi-channel control system of the type described in FIG. 4, item 24. Alternatively, each strut-foil combination may require its own control system and sensors which may be then synchronized from a central control unit.

In addition, it can be seen that a signal $\dot{h}c$ which is proportional to instantaneous craft velocity has been produced in accordance with this invention which may be used, for example, as a stabilizing signal in conjunction with roll and pitch control systems to perform coordinated turn maneuvers.

Furthermore, although the preferred embodiment of my invention shown herein is related specifically to the travel of hydrofoil craft over a disturbing water medium, other novel and useful applications of the principles embodied herein, such as the control of seaplanes during take-off and landing, the stabilization of helicopters, fixed wing aircraft, and "lighter than air" craft in flights subject to a disturbing wind gust medium are within the contemplation and scope of this invention.

What is claimed is:

1. In combination:
   means for producing a leading signal which is independent of craft motion and is a function of fluid displacement from average, varied in accordance with a predetermined function of average fluid amplitude;
   and means for varying the motion of a craft traversing said fluid in accordance with said leading signal.

2. In combination:
   a first means for producing a signal which is independent of craft motion and is a function of the relative separation of a craft from a fluid medium;
   and means coacting with said first means to produce a leading signal of fluid displacement from average, varied in accordance with a predetermined function of average fluid amplitude.

3. In combination:
   a first means for producing a signal which is a function of the relative separation of a craft from a fluid medium;
   a second means for producing a signal which is a function of the vertical craft displacement;
   means for combining said first and second means signal to produce a signal which is a function of the vertical fluid displacement from average;
   predicting means to produce a leading signal of said vertical fluid displacement signal;
   and means to vary said leading signal according to a predetermined function of average fluid amplitude.

4. In combination:
   a first means for producing a signal which is a function of the relative separation of a craft from the fluid medium through which it travels;
   means coacting with said first means to produce a reference signal which is a function of the vertical fluid displacement;
   predicting means to produce a leading signal of said vertical fluid displacement signal;
   and means to vary said leading signal according to a predetermined function of average fluid amplitude.

5. In combination:
   a first means responsive to the separation between a craft and the fluid medium through which it travels and productive of a signal which is a function thereof;
   a second means responsive to the acceleration of said craft and productive of a signal which is a function thereof;
   means coacting with said second means to produce a signal which is a function of the double integral of the craft acceleration;
   means to combine said integrating means signal and said signal which is a function of the separation between craft and the fluid medium to produce a signal which is a function of the height of the water wave above average;
   means to produce a leading signal of said fluid wave motion;
   and means to vary said leading signal according to a predetermined function of average fluid amplitude to provide a control signal.

6. In combination:
   means responsive to the distance between a traversing means and a supporting traversed means and productive of a signal proportional thereto;
   inertially referenced means responsive to the acceleration of said traversing means and productive of a signal proportional thereto;
   integrating means coacting with said inertially referenced means to produce an inertially referenced signal proportional to the motion of said traversing means;
   and means for combining said signal proportional to the movement of said traversing means and said signal proportional to the distance between said traversing means and said supporting traversed means to produce an inertially referenced output signal proportional to the movement of said traversed means and which is independent of the motion of said traversing means.

7. In combination:
   a first means productive of a signal proportional to the phase difference between the motion of a traversing means and the predicted motion of a supporting traversed means;
   a second means productive of a signal proportional to the motion of said supporting traversed means and which is independent of the motion of said traversing means;
   means coupled to said second means for producing a signal proportional to the average of said second means motion signal;
   and means for varying said phase difference signal in amplitude and frequency in accordance with said average supporting traversed means motion signal.

8. In combination:
   a first means responsive to the movement between a traversing means and a traversed means and productive of a signal proportional thereto;
   a second means responsive to the acceleration of said traversing means and productive of a signal proportional thereto;
   a first integrating means coacting with said second means to produce a signal proportional to the velocity of said traversing means;
   a second integrating means coacting with said first integrating means to produce a signal proportional to the movement of said traversing means;
   means whereby said signal proportional to the movement of said traversing means and said signal proportional to the movement between said traversing means and said traversed means are combined to produce an output signal proportional to the movement of said traversed means;
   means whereby said output signal proportional to the movement of said traversed means is phase corrected;
   means whereby said phase corrected signal is combined with said first means signal to produce a predicted traversed means wave motion signal;
   and means responsive to said latter recited means productive of traversing means motion in accordance with said latter recited means.

9. In combination:
   a first means responsive to the distance between a traversing means and a traversed means and productive of a signal which is a function thereof;
   a second means responsive to the acceleration of said traversing means and productive of a signal which is a function thereof;
   a first integrating means coacting with said second means to produce a signal which is a function of the velocity of said traversing means;
   means whereby said signal which is a function of the movement of said traversing means and said signal which is a function of the distance between said traversing means and said traversed means are combined to produce an output signal which is a function of the movement of said traversed means;
   means whereby said output signal which is a function of the movement of said traversed means is differentiated by a plurality of differentiators to produce a plurality of derivatives thereof;

means whereby said plurality of derivatives are combined with said signal which is a function of the movement of said traversing means to produce a signal which is a function of the predicted wave motion of said traversed means;

and means responsive to the output of said latter recited means and productive of a traversing means motion in accordance with the predicted motion of said traversed means.

10. In combination:

a first means responsive to the distance between a traversing means and a traversed means and productive of a signal proportional thereto;

a second means responsive to the acceleration of said traversing means and productive of a signal proportional thereto;

a third means productive of a signal proportional to a pre-established average distance between said traversing means and said traversed means;

a first integrating means coacting with said second means to produce a signal proportional to the velocity of said traversing means;

a second integrating means coacting with said first integrating means to produce a signal proportional to the movement of said traversing means;

difference means whereby said first means signal and said third means signal are combined to produce a signal proportional to the difference between said first and third means signal;

summing means whereby said latter recited signal and said signal proportional to the movement of said traversing means are combined to produce a signal proportional to the difference between the present average traversing means motion and the pre-established average traversing means motion, and a signal proportional to the traversed means in motion;

means responsive to said signal proportional to said traversed means motion and productive of a phase leading signal thereof;

and summing means whereby said phase leading signal and said signal proportional to the difference between said first and third means signal are combined to produce a signal proportional to the difference between the present average traversing means motion and the pre-established traversing means motion plus a signal proportional to the amplitude and phase difference between said traversing means motion and the predicted traversed means motion.

11. In combination:

a first means responsive to the distance between a traversing means and a traversed means and productive of a signal proportional thereto;

a second means responsive to the acceleration of said traversing means and productive of a signal proportional thereto;

a third means productive of a signal proportional to a pre-established average distance between said traversing means and said traversed means;

a first integrating means coacting with said second means to produce a signal proportional to the velocity of said traversing means;

a second integrating means coacting with said first integrating means to produce a signal proportional to the movement of siad traversing means;

difference means whereby said first means signal and said third means signal are combined to produce a signal proportional to the difference between said first and third means signal;

a first combining means whereby said latter recited signal and said signal proportional to the movement of said traversing means are combined to produce a signal proportional to the difference between the present average traversing means motion and the pre-established average traversing means motion, and a signal proportional to the traversed means in motion;

means responsive to said signal proportional to said traversed means motion and productive of a phase leading signal thereof;

a second combining means whereby said phase leading signal and said signal proportional to the difference between said first and third means signal are combined to produce a signal proportional to the difference between the present average traversing means motion and the pre-established traversing means motion plus a signal proportional to the amplitude and phase difference between said traversing means motion and the predicted traversed means motion;

and means responsive to the output of said latter recited means and productive of a traversing means motion in accordance thereto.

12. In combination:

a first means responsive to the distance between a traversing means and a traversed means and productive of a signal proportional thereto;

a second means responsive to the acceleration of said traversing means and productive of a signal proportional thereto;

a third means productive of a signal proportional to a pre-established average distance between said traversing means and said traversed means;

a first integrating means coacting with said second means to produce a signal proportional to the velocity of said traversing means;

a second integrating means coacting with said first integrating means to produce a signal proportional to the movement of said traversing means;

difference means whereby said first means signal and said third means signal are combined to produce a signal proportional to the difference between said first and third means signal;

a first summing means whereby said latter recited signal and said signal proportional to the movement of said traversing means are combined to produce a signal proportional to the difference between the present average traversing means motion and the pre-established average traversing means motion, and a signal proportional to the traversed means motion;

predicting means responsive to traversed means motion signal and productive of a phase leading signal thereof;

a second summing means whereby said phase leading signal and said signal proportional to the difference between said first and third means signal are combined to produce a signal proportional to the difference between the present average traversing means motion and the pre-established traversing means motion plus a signal proportional to the amplitude and phase difference between said traversing means motion and the predicted traversed means motion;

averaging means responsive to said traversed means motion signal and productive of an average signal thereof;

self-adaptive control means whereby a pre-established function of said latter recited averaging means signal varies said second summing means signal;

and means responsive to the output of said latter recited means and productive of a traversing means motion in accordance thereto.

13. In combination:

means traversing a supporting medium having a first means responsive to the relative motion of said supporting medium with respect to said traversing means;

a second means responsive to the motion of said traversing means with respect to a pre-established reference;

integrating means co-acting with said second means to produce a double integration of said traversing means motion with respect to a pre-established reference;

and summing means whereby said first means signal is added to said integrating means signal to produce a signal proportional to the motion of said supporting medium with respect to a pre-established reference.

14. In combination:

means traversing a supporting medium and in contact therewith, said traversing means having a first sensor responsive to the relative motion of said supporting medium with respect to the motion of said traversing means, and a second sensor responsive to the acceleration of said traversing means with respect to an inertial reference;

integrating means co-acting with said second sensor to produce a signal proportional to the motion of said traversing means with respect to an inertial reference;

summing means whereby the signal from said first sensor is added to said integrating means signal to produce an inertially referenced supporting medium motion signal;

predicting means co-acting with said summing means signal and productive of a phase leading signal of said supporting medium motion;

summing means whereby said predicting means signal is added to said first sensor signal to produce a command signal proportional to the difference between the predicted future motion of said supporting medium and the motion of said traversing means;

adaptive control means, whereby said latter recited signal is varied according to a predetermined function of the amplitude of said supporting medium wave motion;

and means responsive to said frequency bandwidth and amplitude varied signal and productive of a traversing means motion in accordance thereto.

15. The combination in a seacraft of:

a first means responsive to the separation between said craft and the water medium over which it travels and productive of a signal proportional thereto;

an inertially referenced means responsive to the acceleration of said craft and productive of a signal proportional thereto;

integrating means co-acting with said inertially referenced means and productive of a signal proportional to the double integral of the craft acceleration;

means whereby said integrating means signal and said signal proportional to the separation between craft and the water are combined to produce a signal proportional to the height of the water wave above average;

and control means comprising, a predictor means whereby said water height above average signal is differentiated a plurality of times to produce a leading signal of the water wave motion and summing means whereby said leading signal is combined with said signal proportional to separation between craft and water to produce a predictive signal proportional to the difference between the craft motion and the predicted water wave motion.

16. A seacraft of the type described having:

a first means responsive to the separation between said craft and the water medium over which it travels and productive of a signal proportional thereto;

an inertially referenced means responsive to the acceleration of said craft and productive of a signal proportional thereto;

integrating means co-acting with said inertially referenced means and productive of a signal proportional to the double integral of the craft acceleration;

means whereby said integrating means signal and said signal proportional to the separation between craft and the water are combined to produce a signal proportional to the height of the water wave above average;

control means comprising, a predictor means whereby said water height above average signal is differentiated a plurality of times to produce a leading signal of the water wave motion and summing means whereby said leading signal is combined with said signal proportional to separation between craft and water to produce a predictive signal proportional to the difference between the craft motion and the predicted water wave motion;

self-adaptive means comprising, an average means productive of a signal proportional to the average water amplitude, and an adaptive control circuit co-acting with said averaging means whereby said predictive signal is varied in amplitude and bandwidth according to a pre-established function of said average water amplitude;

and means responsive to said bandwidth and amplitude varied control signal whereby craft motion is maintained in substantial conformity with water wave motion.

17. The combination in a craft traversing disturbing water medium of:

a first means responsive to the separation between said craft and the water medium over which it travels and productive of a signal proportional thereto;

a second means productive of a signal proportional to a desired average distance between craft and water;

a third means whereby said first means signal and said second means signal are combined to produce an error signal proportional to the error between the desired average distance between water and craft and the actual average distance between water and craft, plus a difference signal proportional to the difference between the water height above average and the craft height above average;

an inertially referenced means responsive to the acceleration of said craft and productive of a signal proportional thereto;

integrating means co-acting with said inertially referenced means and productive of a signal proportional to the double integral of the craft acceleration;

and a fourth means whereby said integrating means signal and said third means signal are combined to produce an error signal proportional to the error between the desired and actual average distance between water and craft, plus an inertially referenced signal proportional to the height of the water wave above average.

18. A seacraft of the type described having:

a first means responsive to the separation between said craft and the water medium over which it travels and productive of a signal proportional thereto;

a second means productive of a signal proportional to a desired average distance between craft and water;

a third means whereby said first means signal and said second means signal are combined to produce an error signal proportional to the error between the desired average distance between water and craft and the actual average distance between water and craft, plus a difference signal proportional to the difference between the water height above average and the craft height above average;

an inertially referenced means responsive to the acceleration of said craft and productive of a signal proportional thereto;

integrating means co-acting with said inertially referenced means and productive of a signal proportional to the double integral of the craft acceleration;

a fourth means whereby said integrating means signal and said third means signal are combined to produce an error signal proportional to the error between the desired and actual average distance between water and craft, plus an inertially referenced signal proportional to the height of the water wave above average;

means responsive to said inertially referenced signal proportional to water wave height above average and productive of a phase additive signal thereof;

means whereby said phase additive signal and said fourth means signals are combined to produce an error signal proportional to the error between the desired and actual average distance between water and craft, plus an error signal proportional to the difference between the predicted wave motion and the present craft motion;

and means responsive to said latter recited signals and productive of a craft motion in accordance thereto.

19. A seacraft of the type described having:

a first means responsive to the separation between said craft and the water medium over which it travels and productive of a signal proportional thereto;

a second means productive of a signal proportional to a desired average distance between craft and water;

a third means whereby said first means signal and said second means signal are combined to produce an error signal proportional to the error between the desired average distance between water and craft and the actual average distance between water and craft, plus a difference signal proportional to the difference between the water height above average and the craft height above average;

an inertially referenced means responsive to the acceleration of said craft and productive of a signal proportional thereto;

integrating means co-acting with said inertially referenced means and productive of a signal proportional to the double integral of the craft acceleration;

a fourth means whereby said integrating means signal and said third means signal are combined to produce an error signal proportional to the error between the desired and actual average distance between water and craft, plus an inertially referenced signal proportional to the height of the water wave above average;

means responsive to said inertially referenced signal proportional to water wave height above average and productive of a phase additive signal thereof;

a fifth means whereby said phase additive signal and said fourth means signals are combined to produce an error signal proportional to the error between the desired and actual average distance between water and craft, plus an error signal proportional to the difference between the predicted wave motion and the present craft motion;

averaging means responsive to said fourth means signal and productive of a signal proportional to the average height of the water;

means responsive to said averaging means signal and said fifth means signal whereby said fifth means signal is varied in accordance with a pre-established function of said averaging means signal;

and means responsive to said latter recited signals and productive of a craft motion in accordance thereto.

20. A seacraft of the type described having:

at least one first means responsive to the separation between said craft and the water medium over which it travels and productive of a signal proportional thereto;

at least one inertially referenced means responsive to the acceleration of said craft and productive of a signal proportional thereto;

integrating means co-acting with said inertially referenced means and productive of a signal proportional to the double integral of the craft acceleration;

means whereby said integrating means signal and said signal proportional to the separation between craft and the water are combined to produce a signal proportional to the height of the water wave above average;

control means comprising, a predictor means whereby said water height above average signal is differentiated a plurality of times to produce a leading signal of the water wave motion and summing means thereby said leading signal is combined with said signal proportional to separation between craft and water to produce a predictive signal proportional to the difference between the craft motion and the predicted water wave motion;

self adaptive means comprising, an averaging means productive of a signal proportional to the average water amplitude, and an adaptive control circuit co-acting with said averaging means whereby said predictive signal is varied in amplitude and bandwidth according to a pre-established function of said average water amplitude;

and means responsive to said bandwidth and amplitude varied control signal whereby craft motion is maintained in substantial conformity with water wave motion.

References Cited in the file of this patent
UNITED STATES PATENTS

| | | |
|---|---|---|
| 2,511,846 | Halpert | June 20, 1950 |
| 2,550,220 | Bussei | Apr. 24, 1951 |
| 2,621,873 | Gordon | Dec. 16, 1952 |
| 2,649,563 | Meredith | Aug. 18, 1953 |
| 2,841,345 | Halpert et al. | July 1, 1958 |
| 2,890,671 | Hobday | June 16, 1959 |
| 2,901,996 | Bell | Sept. 1, 1959 |
| 2,962,243 | Coleman et al. | Nov. 29, 1960 |
| 3,031,662 | Bond | Apr. 24, 1962 |